March 21, 1944.  W. C. SMITH  2,344,925
TOOL DEVICE
Filed June 26, 1943
FIG. 1
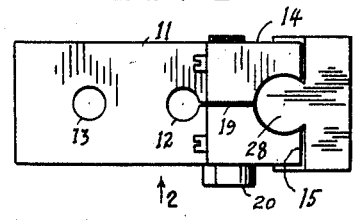
FIG. 3    FIG. 2    FIG. 4
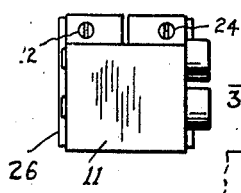 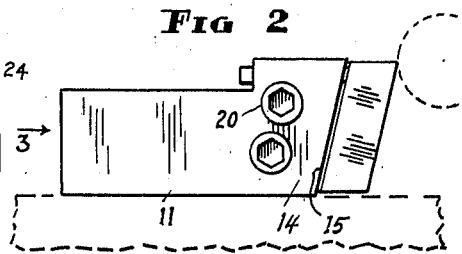 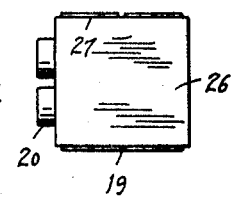
FIG. 5
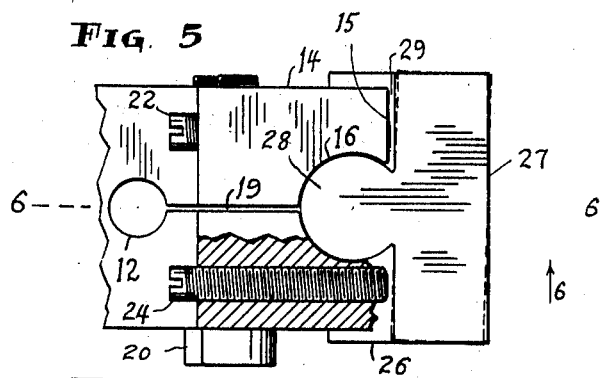
FIG. 6
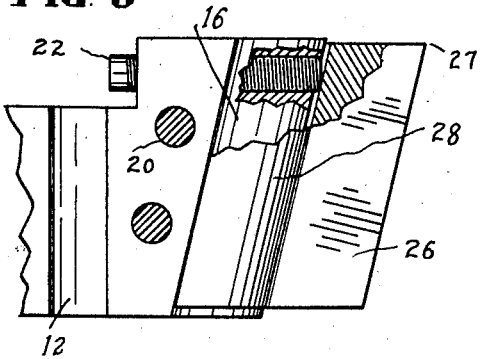
FIG. 7
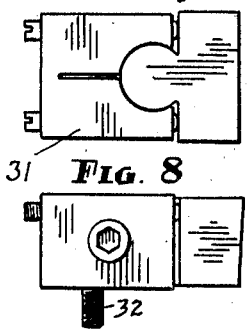
FIG. 8
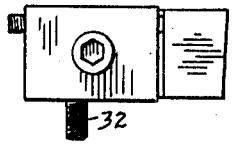
INVENTOR.
WILLIAM C. SMITH
BY Thomas L. Ryan
ATTORNEY.

Patented Mar. 21, 1944

2,344,925

UNITED STATES PATENT OFFICE 2,344,925

TOOL DEVICE

William C. Smith, Springport, Ind.

Application June 26, 1943, Serial No. 492,655

5 Claims. (Cl. 29—96)

This invention relates to improvements in tool devices of the kind used in connection with machines such as lathes, automatic screw machines, and the like wherein the work piece, conventionally retained as by a collet or chuck, is rotated, and the tool device mounted on a carrier therefor (which forms a part of the machine proper) is moved to, and its bit or cutting tool is held engaged with and in cutting relation with said work piece.

My invention has especial reference to a tool device for use in procedures such as forming, and/or in procedures such as shaving, and wherein in such procedures the bit used is of relatively wide formation and it is directed at a right angle to the longitudinal axis of the work piece. Experience has taught that on account of the varying characteristics of, and the varying conditions which are incident to the operation of a machine in which a tool device of the above description is used, and that also, on account of variations in the stiffness of the work piece, deflection of the work piece from true alignment frequently occurs. The result of such deflection is an irregular or distorted cut. As a result of the inherent uncertainty of perfect and constant straight alignment of the work piece, and of the distorted cut which is sure to ensue, considerable time is lost, material is spoiled, and production schedules are seriously delayed.

I am aware that tool devices of divers descriptions, and of the well known dove-tail type have heretofore been devised, and that same are capable of certain adjustments; however there being in such earlier inventions, no practicable means for rearranging the cutting bit so as to compensate for the irregularities contended with, as above outlined, expedients have necessarily been resorted to, such as shimming, wedging, and straining the tool to one position or another in an effort to get it aligned so as to get the perfection of cut desired. Obviously such efforts are futile for the reason that even though the tool device or the cutter bar thereof might be realigned or re-set, there has been not only inconvenience and loss of time and injury to both the material being worked on, and to the tool device itself, but for lack of correct and lack of dependable maintenance of the cutting bit in adjusted position, the latter is soon again ineffective and a recurrence of imperfection of cut is inevitable.

To overcome the above named disadvantages, the object of my invention, broadly stated, is to provide a tool device wherein the cutting bit thereof is capable of being adjusted, not only to position of engagement with the work, but of being poised and made secure in such cutting alignment as may be dictated by the particular work piece being operated on. The said general object, as well as other and more specific aims having to do with structural features involved in carrying my broad idea into effect, as will presently appear, are accomplished by and the invention is embodied in the new construction, combination, and arrangement of parts described in the following specification and illustrated in the accompanying drawing.

Figure 1 is a top plan view of my improved tool device as it appears in form for use in the procedure of forming. In this view the body or holder portion of the device is elongated, and the cutting bit or tool is relatively wide, and in the present instance its cutting edge is of straight formation.

Figure 2 is a side view, taken in the direction of arrow 2 in Figure 1.

Figure 3 is a rear end view taken in the direction of arrow 3 in Figure 2.

Figure 4 is a front view, taken in the direction of arrow 4 in Figure 2.

Figure 5 is an enlarged top plan view of the forward or head portion of my improved tool device, a portion thereof being shown in cross section.

Figure 6 is a vertical central cross section view taken on the broken line 6—6 in Figure 5, in the direction of arrow 6, the cutting bit being shown in elevation, and a portion thereof being broken away.

Figure 7 is a top plan view showing my invention in a form modified, for use in the procedure of shaving, in this modification the body or holder portion of the device being of relatively short formation.

Figure 8 is a side view of Figure 7.

The body or holder portion of my improved tool device has elongated stem portion 11, rectangular in cross section, and it is provided with spaced vertical holes 12 and 13 which are adapted to receive connections for fastening the body to the machine (not shown).

Provided in the head portion 14 of said body, in parallelism with the conventionally inclined frontal face 15 thereof, is a cylindrical bore 16 the frontal portion of which is segmented, thereby constituting a vertical opening through the said frontal face 15 of said body. It will be observed that the axis of said bore is inwardly offset from said face 15 a distance equivalent of about twothirds of the radius of said bore, as indicated in Figure 5.

A central vertical cleft 19 extends from the rear side of said bore and into the vertical hole 12 of said body, the head portion 14 thereof thereby being of divided formation. Headed transverse clamp screws 20 passed through holes therefor in one side of said head, and threaded in the other side of said head 14, constitute means operable manually whereby the sides of said head portion 14 of said body may be drawn toward each other and caused to securely grip within said bore, the shank of the cutter bit presently to be referred to.

In each side of the head portion 14 of said body, at its upper portion, is a longitudinal screw which extends through the frontal face 15. These screws are designated 22 and 24, as indicated in Figure 5.

Cutting bit consists of plate 26 of tool steel with cutting edge 27, said plate and the edge thereof being of conventional formation in plan. Integrated with the rear side of said tool plate is cylindrical shank 28 and which is machined so as to fit closely in the bore of said head. The said cutting bit lends itself to being made of a unitary piece of metal, or to being made of plate 26 with its shank secured integrally thereto as by welding, or as by other means such as screws or rivets suitably countersunk. The said shank is so located, and its axis is so offset from the plane of the rear side of said plate 26 that there is provided a clearance 29 (see Figure 5) between the tool plate and the frontal face 15 of said body, thereby enabling the poising of the bit at a slight angle to the vertical axis of the body, as indicated by the broken lines in Figure 5.

My invention, in the form thereof as intended for the procedure of forming, appears, as indicated in Figure 2, the movable portion of the machine to which the device is attached, and the work piece upon which operation is to be had (not shown) being indicated diagrammatically by the broken lines.

In the driving of the tool against the work piece, so long as the initial relation between the cutter bit and the work piece continues unchanged, and so long as the work piece is running in true alignment, it is obvious that in cutting, the bit will cut to the line predetermined, that is to say, precisely parallel with the longitudinal axis of the work piece. At such time as the work piece may for any reason become deflected from its true alignment, and the line of cut will accordingly become out of true, adjustment of the poise of the bit will then be necessary.

To make the necessary adjustment, the clamp screws 20 are loosened thereby releasing the grip of the sides of the head. The operator, then, by turning one, and then the other of the adjusting screws 22 and 24 may vary to a nicety, the angle of lateral incline of the bit to compensate for the angle of deflection which is incident to such irregularity of alignment as may be affecting the true running of the work piece. Obviously, the adjusting screws when set at the desired position, function to hold the bit immovable pivotally. Then after tightening of the clamp screws 20 the sides of the body will have been drawn to and secured, the cutting bit thereby being rigidly held in its adjusted position.

As hereinbefore stated, I well understand that tool devices for the procedures of forming, and for shaving, have heretofore been used, and I am confining my claims to a tool device wherein I provide for the adjusting of the cutting bit with relation to the longitudinal axis of the work piece. And definitely to a combination and arrangement of parts in which the cutting bit is integrated at its rear side with a column like shank, circular in cross section, and segmented at the side thereof which joins the said bit; the said shank being reposed in a bore therefor provided in the body or holder part of the device, and screws carried by and operable in the said body whereby the operator may move the bit to adjusted position of angularity with relation to the holder port or body, thereby enabling the bit to be precisely and dependably aligned with relation to the material being worked on.

The above named adjustment may be effected readily and easily by backing one of the screws 22 or 24, and projecting the other, or vice versa, the shank acting as an axis whereby the bit is capable of being poised to correct alignment. In the use of my invention there is of course the elimination of any necessity of resorting to the use of shims, or to the practice of twisting or "cocking" any part of the device, both of which expedients being commonly used on tool devices of known and conventional type. Whereas my invention is described and illustrated in the form intended for use in connection with automatic screw machines, and for the procedure of forming, it may be equally well adapted for the procedure of shaving.

A form of embodiment adapted for performing the shaving operation, is shown in the modification appearing in Figures 7 and 8 of the drawing, wherein the body 31 is of shortened formation, and the means for securing it to the carrier therefor (not shown) may consist of a threaded stud 32. Also the slant of the face of the bit is modified.

It will be understood that minor modifications and alterations may be made in the structural features and details, as may occur to a person skilled in the art to which the invention appertains, without departing from the principle of the invention, and I wish the invention to be construed as of the breadth and scope as defined in the claims.

What I claim as my invention is:

1. A tool device of the kind and for the purposes described, consisting of a body having a cylindrical bore in the head portion thereof, the said bore being segmented in parallelism with its main axis, and whereby a gap in the face portion of the said body is constituted, a cutter bit having a shank of cylindrical formation in cross section, and which is inset and integrated along a segmental line at its side with the rear side of said bit, and the body portion of said shank being pivotally reposed in the bore of said body, there being a clearance space between the frontal face of said body and the rear side of said bit, and an adjusting screw in said body at either side of said bore, and both of said screws being operable to engagement with the rear side of the said cutter bit.

2. A tool device of the kind described, consisting of a body having a cylindrical bore in the head portion thereof, the said bore being segmented at a line relatively close to its periphery and in parallelism with the main axis of said bore, whereby a gap in the face portion of said body is constituted, a central vertical cleft in the forward portion of said body thereby dividing the latter, a cutter bit having a shank of cylindrical formation in cross section, and which is segmented on a line adjacent to its periphery and is joined at said segmental line to the rear side of said bit at the center of the latter, and the said shank being reposed in the bore of said body, there being a clearance space between the frontal face of said body and the rear side of said bit, an adjusting screw in each side of the head portion of said body, and which said screws are operable to engagement with the rear side of said bit, and clamp screws interconnecting the sides of the head portion of said body.

3. A tool device of the kind described, consisting of a body adapted to be secured to the carrier member of the machine, said body having a bore, a side of said bore being segmented through the frontal face of said body thereby constituting a gap thereat, a cutter bit having a shank segmented at a point on its radius predetermined with relation to the segmentation of said bore, and which said shank is integrated at its segmented portion with the rear side of said cutter bit, and is swiveled in the bore of said body, there being a clearance between the frontal face of said body and the rear side of said bit, and a screw extending through each side of the head portion of said body and to engagement with the rear side of said cutter bit, whereby the said bit may be manually moved rotatably to adjusted position, and may be locked in said adjusted position.

4. Claim in accordance with claim 3, with the inclusion of a vertical central longitudinal cleft extending rearwardly from said bore thereby dividing the head portion of the body, and transverse clamp screws interconnecting the sides of said head portion of said body.

5. A tool device consisting of a body structure adapted to be secured to the carrier member of the machine, said body having a bore longitudinally segmented at a point on its radius a predetermined distance from the axis of said bore thereby constituting a gap in the frontal face of said body, a cutter bit having a shank longitudinally segmented at a point on its radius predetermined with relation to the line of segmentation of the said bore, and which said shank is integrated at said line of segmentation with the rear side of said cutter bit, and is swiveled in the bore of said body, there being a clearance space between the frontal face of said body and the rear side of said bit, and means on said body that are manually operable to move the cutter bit rotatably to, and to secure same rigidly in adjusted position.

WILLIAM C. SMITH.